United States Patent Office 3,644,321
Patented Feb. 22, 1972

3,644,321
POLYOLEFIN PURIFICATION
Michio Koga and Masaru Kani, Yokkaichi-shi, Japan, assignors to Mitsubishi Petrochemical Company Limited, Tokyo-to, Japan
No Drawing. Filed July 16, 1969, Ser. No. 842,393
Claims priority, application Japan, July 17, 1968, 43/50,415; Mar. 19, 1969, 44/20.403
Int. Cl. C08d 5/00; C08f 3/06, 3/10
U.S. Cl. 260—93.7                                          4 Claims

ABSTRACT OF THE DISCLOSURE

After alcohol treatment, a polyolefin is treated with an alkaline aqueous solution of a pH value of at least 5 in which catalyst residue separates, thereby causing stratification and formation of an aqueous phase in which at least a majority part of the catalyst residue is suspended and an oil phase in which the polyolefin is suspended, and the aqueous phase is then separated from the oil phase. Purification is still further improved by a process step of neutralization of acidic substances prior to the alkaline solution treatment.

BACKGROUND OF THE INVENTION

This invention relates generally to the production of polyolefins and more particularly to a new and improved process for purifying polyolefins whereby catalyst residue can be thoroughly removed.

Polyolefins produced through the use of so-called Ziegler-type catalysts, in their unpurified as-produced state, contain residue of metal components of the catalysts, which residue impairs the product quality of the polyolefins since the product is thereby discoloured and the ash content thereof becomes high. Accordingly, various methods for purifying such polyolefins have been proposed.

In one of these proposed methods a polyolefin obtained by the use of a so-called Ziegler-type catalyst is treated with an alcohol in the presence of a liquid hydrocarbon and then treated with an alkaline aqueous solution. For the second step of this method, there are the technique wherein a weakly alkaline substance such as sodium acetate or an organic amine is added merely to prevent corrosion (e.g.) as described in Japanese patent publication No. Sho 35-941, published Feb. 18, 1960 (Pat. No. 267,-795, patented Nov. 15, 1960), entitled "After Treatment of Polyolefins") and the technique wherein a strongly alkaline substance for producing a pH value of the aqueous phase of at least 10 and a complexing agent for forming titanium complex compounds soluble in strongly alkaline aqueous solutions are combined (as described in Japanese patent publication No. Sho 35-14788, published Oct. 6, 1960 (Pat. No. 274,239, patented Apr. 5, 1961), entitled "Method of Removing Metal Compounds From Olefin Polymers").

Each of these methods are carried out under conditions such that the catalyst residue to be removed is in a dissolved state, and, ordinarily, separation thereof from a solid-phase polyolefin is carried out. In Japanese Pat. No. 267,795 referred to above, it is set forth that titanium hydroxide precipitates when a dilute caustic soda solution is used for the above mentioned second process step, and the ash content becomes greater than that in the case of treatment with pure water which was originally the treatment of the second step in this method.

While the above mentioned methods are advantageous in comparison with water rinsing on the acidic side (with the use of an acid) which is accompanied by the drawbacks of insufficient purification and, moreover, high corrosiveness, they are not fully satisfactory in all cases. For example, these methods require the use of ample quantities of reagents for solubilising titanium compounds, which reagents, moreover, are generally expensive, and the purification is not fully effective in all cases.

Accordingly, there has been a great need for the development of an improved method of accomplishing purification under non-corrosive conditions and at low cost by which method polyolefin products containing very low content of catalyst residue and having improved colouration can be readily produced at low cost.

SUMMARY OF THE INVENTION

It is an object of the present invention to provide a purification process whereby the above stated need can be met. This object has been achieved in accordance with the invention by carrying out the aforementioned step of treatment with an alkaline aqueous solution under conditions conducive to separating out of the catalyst residue in the solution.

Another object of the invention is to provide a further improved polyolefin purification process whereby a high purification effectiveness can be attained. This object has been achieved in accordance with the invention by carrying out neutralisation of acidic substances prior to the aforementioned step of treatment with an alkaline aqueous solution.

According to the present invention in one aspect thereof, briefly summarised, there is provided a process for purification of polyolefins of the character referred to above which is characterised in that the second process step of treatment with an alkaline aqueous solution is carried out by the use of an alkaline aqueous solution of pH value above 5 under condition conducive to separating out of the catalyst residue to produce a stratification of an aqueous phase in which at least the greater part of the catalyst residue is maintained as a suspension and an oil phase in which the polyolefin is maintained in suspended state, and this aqueous phase is separated from the oil phase thereby to separate at least the greater part of the catalyst residue from the polyolefin.

According to the present invention in another aspect thereof, there is provided a polyolefin purification process of the above described character which is further characterised by the step after the alcohol treatment and prior to the rinsing with an alkaline aqueous solution of neutralising from 5 to 80 mol percent of acidic substances within the catalyst in a non-aqueous system.

Thus, in accordance with the invention, in general, a positive effort is made to separate and remove the catalyst residue in the latter step of treatment with the alkaline aqueous solution. We have thereby succeeded in removing the catalyst residue in polyolefins with greater effectiveness than was heretofore possible, contrary to the teachings of the known art.

The nature, principles, details, and utility of the invention will be more clearly apparent from the following detailed description beginning with general considerations and concluding with specific examples of practice constituting preferred embodiments of the invention.

DETAILED DESCRIPTION

The principal feature of the invention in the above mentioned second aspect thereof is the addition of the step of neutralising acidic substances within the catalyst to the process of the invention, which comprises the procedures begining essentially with the second process. In the practice of this invention, this neutralisation step is considered to contribute the following effect. (This theory, however, is not to be construed as limiting the scope of the invention.)

It may be considered that in the catalyst residue removal process comprising an alcohol treatment and an alkaline aqueous solution treatment, the catalyst is decomposed by the alcohol treatment, and the substances produced by this decomposition are extracted from an oil phase to an aqueous phase by the alkaline aqueous solution rinsing. However, when merely an alcohol treatment is carried out, the extractability by the alkaline aqueous solution of the decomposition products is insufficient. In this case, by treating the alcohol decomposed products with a neutralising agent to effect a specific degree of neutralisation, it is possible to increase the extractability by the alkaline aqueous solution, whereby the ash content within the polyolefin can be removed with greater effectiveness.

A neutralisation step from which such effectiveness is to be expected requires the fulfilment of various critical conditions. More specifically, this process step should be carried out as an independent step between the alcohol treatment step and the alkaline aqueous solution rinsing step (as indicated by Reference Examples 1 and 2 set forth hereinafter), in a non-aqueous system (Reference Example 1), and with a limited degree of neutralisation (Reference Example 3).

The process of the present invention is most suitably applicable to the purification of polyolefins produced by the use of Ziegler-type catalysts. As is known, these catalysts comprise combinations of compounds of metals of Groups IV through VI-A of the Periodic Table and compounds such as hydrides and organic metal compounds of metals of Groups I, II, and III, the most representative of these catalysts being combinations of titanium compounds and organo-aluminium compounds. While the present invention is applicable to any polyolefin prepared through the use of a catalyst of the above described character, the most representative of these polyolefins are polyethylene, polypropylene, and poly(ethylene/propylene) copolymers.

Polyolefins of the above described character are subjected to purification in the presence of a liquid hydrocarbon. Since the above mentioned representative polyolefins, in general, have solubilities in liquid hydrocarbons ranging from insoluble to slightly soluble, the ordinary practice is to carry out purification of liquid suspensions of the polyolefins suspended in liquids. For such a liquid suspension, the suspension obtained from the polymerisation process can be used directly, this being the ordinary procedure according to the invention. In this case, substantially the entire quantity of the catalyst used is transferred to the purification process of the invention.

While the quantity of the liquid hydrocarbon may be suitably selected, we have found a quantity of from 100 to 900 percent by weight with respect to the polyolefin is generally desirable. For the liquid hydrocarbon, any of aliphatic, alicyclic, and aromatic hydrocarbons which have carbon atoms of the order of $C_4$ to $C_{12}$ and are usable as suspension mediums in the olefin polymerisation process can be selected.

For the alcohol to be used in the first process step, any alcohol which is soluble in the above specified liquid hydrocarbon can be used. Preferably, this alcohol is one which has from 1 to 10 carbon atoms, and dihydric and polyhydric alcohols can also be used. A most typical alcohol which can be used is a monohydric lower alkanol of less than $C_6$.

This alcohol may be in the form of a mixture of two or more alcohols. For example, a mixture such as that of butanol and methanol and that of methanol and isopropanol can be used. We have found further that this alcohol should be desiccated as much as possible and that a suitable quantity thereof for use according to the invention is from 0.3 to 15 percent by volume with respect to the liquid hydrocarbon.

In this first process step, an anhydrous mineral acid (e.g., hydrochloric acid) or a Lewis acid (e.g., aluminium chloride or boric chloride) can be used together with the alcohol in order to promote the decomposition of the catalyst and the dissolving of the catalyst in the liquid hydrocarbon. Furthermore, the use of a surfactant is also desirable for ensuring good contact between the catalyst and the alcohol.

We have found that the following process conditions in the first process step are desirable, in general. The temperature is from 40 degrees C. to the boiling point of the reactant mixture. By applying pressure to the reactant mixture, the boiling point thereof is caused to rise, whereby it is possible to carry out the process at 150 degrees C., for example. The alcohol treatment time is, in general, from a few minutes to several hours, preferably from 10 minutes to 4 hours. It is important that the reactant mixture be agitated thoroughly during the process.

Immediately after this alcohol treatment, or after neutralisation of the acid substances beforehand, the treatment with the alkaline aqueous solution is carried out. Irrespective of whether or not the neutralisation of the acidic substances is carried out, an indispensable process which must be carried out after the alcohol treatment in the process of the invention is a rising of the oil phase resulting after completion of the above described alcohol treatment, this rinsing being carried out with an alkaline aqueous solution of a pH value of 5 or more.

As stated hereinbefore, the catalyst residue is separated in a positive manner by this treatment in accordance with the invention. Accordingly, complexing agents for solubilisations such as those used heretofore are unnecessary. In the case wherein a weak alkali is used, thorough separation of the catalyst residue is ensured by a measure such as increasing the concentration of the alkali.

Examples of alkalis suitable for use in this process step are sodium hydroxide, potassium hydroxide, sodum pyrophosphate, sodium carbonate, metal alcoholates, ammonia, and amine compounds (for example, trethylamine) used singly or as a mixture of two or more thereof. In each case the alkali is used in a quantity such as to cause the water phase pH value to be 5 or higher.

The process conditions in this process step, in general, are as follows. The process temperature is of the order of from 40 to 100 degrees C. It is possible to use a higher temperature under pressurised conditions. The rinsing time is from a few minutes to several hours (preferably from 10 minutes to 2 hours). Although the pH value of the aqueous phase is specified as 5 or higher, it seems that a pH value which is not overly high is desirable when an aluminium component is present in the catalyst residue. In general, the preferable pH range is from 8 to 13.

The purpose of this process step is to separate the catalyst residue from the product. Accordingly chemical agents for promoting the separation and precipitation of the catalyst residue as, for example, surface active agents, precipitants, and coagulants can be advantageously used in this process step. By adding these chemical agents to the alkaline aqueous solution, it is possible to reduce further the quantity of the catalyst residue contained in the product polyolefin.

Furthermore, a bleaching agent such as a sulphite, a hydrogen sulphite (bisulphite), or one of certain fluorescent bleaching agents can be added to the alkaline aqueous solution to impart a white appearance to the product polyolefin. The addition of various stabilisers for the product polyolefin such as an antioxidant to the aqueous solution is also effective. Depending on the properties of a stabiliser to be added, it can be added after the water phase separation to the liquid mixture of the polyolefin in order to prevent loss at the time of the water phase separation.

After completion of the process of treatment with the alkaline aqueous solution, the process material is left standing, whereupon the material is stratified and separates into an aqueous phase in which the greater part of the catalyst residue is retained in suspended state and an oil phase in which the polyolefin is retained as a suspension. By removing this aqueous phase, the greater part of the catalyst residue can be removed from the oil phase and, therefore, from the polyolefin. The oil phase is thereafter rinsed one or more times, depending on the necessity, with pure water or an alkaline aqueous solution of a pH value of 5 or higher thereby to effect thorough removal of the catalyst residue.

The addition of a medium-strong or strong alkali to the oil phase thus processed is desirable for further assuring nullification of the corrosiveness of the polyolefin contained therein with respect to metal structures which the polyolefin may contact. Examples of such an alkali are ammonia, potassium hydroxide, sodium hydroxide, barium hydroxide, calcium hydroxide, and metal alcoholates. These alkalis are used singly or as a mixture of two or more thereof by addition thereof either directly or together with an organic solvent.

The polyolefin can be separated out from the oil phase processed in the above described manner by a suitable known procedure such as filtration or distillation.

In accordance with an even more specific embodiment of the invention, neutralisation in a non-aqueous system is carried out after thorough decomposition of the catalyst by the aforedescribed alcohol treatment and prior to the treatment with the alkaline aqueous solution. In general, this neutralisation is carried out with respect to the product formed in the alcohol treatment (the alcohol is present in the olefin suspension liquid) when the alcohol treatment has been carried out in a non-aqueous system.

The acidic substance to be neutralised in this process step is composed principally of at least one other constituent of the catalyst used, for example, a halogen which has been introduced as a transition metal halide (halogenide), hydrogen chloride being a most representative example. The quantity of this acidic substance is calculated on the basis of one atom of the halogen, e.g., chlorine, within the catalyst taken as one mol. In the case where an acid has been used in the first process step, it is desirable to neutralise this acid prior to or during the instant neutralisation step.

In addition to the carrying out of this neutralisation step in a non-aqueous system, i.e., a state without the presence of water, neutralisation of from 5 to 80 mol percent of the acidic substance is highly important. That is, a low degree of neutralisation does not produce a sufficient effect. On the other hand, excessive neutralisation is not desirable. For example, when neutralising agent in a quantity of 140 mol percent, which is in excess of 80 mol percent, of the acidic substance is used (as in Reference Example 3 set forth hereinafter), there is no effect of actual promotion of catalyst decomposition, and, moreover, the catalyst residue which should be extracted by the succeeding process step of rinsing with the alkaline aqueous solution is separated out in the polyolefin. As a result, the removal of the ash content of the polyolefin is obstructed, and the colour of the product polyolefin is impaired.

For the neutralising agent, any of various alkaline substances or substances corresponding thereto can be used. Specific examples of suitable neutralising agents are sodium hydroxide, potassium hydroxide, sodium pyrophosphate, sodium carbonate, metal alcoholates, ammonia, amine compounds (e.g., ethyleneamine), ethylene oxide, and ethylene oxide derivatives. These agents can be used singly or as mixtures of two or more thereof. While these neutralising agents can be added directly to the process material, it is also possible to use them in the state of a solution or a dispersion. In this case, the solvent should be non-aqueous and, therefore is selected from organic solvents such as alcohols (e.g., a monovalent lower alcohol), acetone, and hydrocarbons.

The process conditions such as temperature and time of the neutralisation process step are substantially the same as those of the aforedescribed first process step.

In order to indicate still more fully the nature and utility of the invention, the following specific examples of practice constituting preferred embodiments of the invention and reference examples for reference purposes are set forth, it being understood that these examples are presented as illustrative only and that they are not intended to limit the scope of the invention.

EXAMPLE 1

Propylene was polymerised for 7 hours in 500 millilitres (ml.) of heptane with the use of 4.5 millimols/litre of titanium trichloride and 9.6 millimols/litre of diethylaluminium chloride as catalyst, whereupon approximately 205 grammes (g.) of a polypropylene was obtained. Several four other samples of polypropylenes were prepared in the same manner.

Next, 14 ml. of butanol was added to each sample polypropylene, and the resulting mixture was agitated for 2 hours at 75 degrees C. and thereafter subjected to rinsing with an alkaline aqueous solution as indicated in the accompanying table. The process material thus rinsed was left standing, whereupon it separated into an oil phase composed of polypropylene, heptane, and butanol and constituting an upper layer and an aqueous phase in which the catalyst residue was suspended, and which constituted a lower layer.

For reference, in the case of Test E in accordance with the method set forth in the aforementioned Japanese Patent No. 274,239, almost no separation and precipitation of the catalyst residue was observable.

Some of the samples were then rinsed five times with water.

After separation of the aqueous phase in each case, the heptane and butanol were separated to produce a polypropylene cake, which was then dried under reduced pressure, whereupon the product polypropylene was obtained. This product material in each case was extruded into pellets.

In the case where the catalyst residue was caused to separate out with a pH value of the aqueous phase of 5 or higher (Test Nos. B and C, as indicated in the table), the effect of removing the catalyst residue was greater than that in the case where an alkali was not used (Test No. A). Moreover, in Test Nos. B and C, the pellets were colourless and transparent, whereas those in Test No. A had a slight yellowish tinge.

Even in the cases where similar use was made of an alkali, the effect of removing the catalyst residue exhibited in the case (Test No. D) in which the residue was separated out was greater than that exhibited in the case (Test No. E) in which the residue was not separated out. Furthermore, the pellets produced in Test No. D were colourless and transparent, whereas those of Test No. E had a slight yellowish tint.

EXAMPLE 2

Ethylene was polymerised for two hours in 500 ml. of heptane with the use of 4.25 millimols/litre of ethylbutoxyaluminium chloride, 0.944 millimol/litre of dichlorotitanium dibutoxide, and 2.60 millimols/litre of dichlorotitanium butoxide. As a result, approximately 210 g. of a polyethylene sample was obtained. A total of two such polyethylene samples were prepared.

Next, 3.6 ml. of butanol was added to each of the polyethylene sample, and the resulting liquid mixture was agitated for two hours at 80 degrees C. and thereafter subjected to treatment with an alkaline aqueous solution as indicated in the same table. After separation of the aqueous phase the heptane and butanol were separated by filtration to produce a polyethylene cake, which was dried under reduced pressure, whereupon the product polyethylene was obtained. Each polyethylene material thus obtained was extruded into pellets.

As indicated in the table, removal of the catalyst residue was more effectively accomplished in the case (Test No. G) wherein the residue was separated out through the use of an alkaline aqueous solution than in the case (Test No. F) wherein mere water rinsing was carried out, and the catalyst residue was not separated out. Furthermore, the pellets in the former case were colourless and transparent, whereas those of the latter case had a yellowish tint.

Reference Example 1

To a polypropylene prepared in accordance with step (1) in Example 3, 55 litres of heptane and 1.6 litres of

| | Example | | | | | | |
|---|---|---|---|---|---|---|---|
| | 1 | | | | | 2 | |
| Test No. | A | B | C | D | E | F | G |
| Polyolefin | (¹) | (¹) | (¹) | (¹) | (¹) | (²) | (²) |
| Quantity formed (g) | 204 | 215 | 210 | 205 | 207 | 211 | 209 |
| KOH (g) | 0 | 0.65 | 0.95 | 0.95 | (³) | 0 | 0.725 |
| Water (g) | 408 | 430 | 420 | 410 | 414 | 900 | 900 |
| Time (hr.) | 1.0 | 1.0 | 1.0 | 1.0 | 1.0 | 1.0 | 1.0 |
| Temperature (° C.) | 70 | 70 | 70 | 70 | 70 | 83 | 83 |
| Agitation speed (r.p.m.) | 300 | 300 | 300 | 600 | 600 | | |
| Aqueous phase pH | 3.6 | 6.0 | 10.3 | 10.5 | 13.4 | 4.5 | 9.8 |
| Separation of catalyst residue | None | (⁴) | (⁴) | (⁴) | None | None | (⁴) |
| Rinse water quantity ×rinses | None | None | None | 3 kg.×6 | 3 kg.×5 | None | None |
| Agitation speed (r.p.m.) | | | | 1,000 | 1,000 | | |
| Al content in product (wt. percent) | 0.008 | 0.007 | 0.006 | 0.002 | 0.003 | 0.02 | 0.01 |
| Ti content in product (wt. percent) | 0.006 | 0.004 | 0.004 | 0.002 | 0.002 | 0.02 | 0.02 |
| Pellet colour | (⁵) | (⁶) | (⁶) | (⁶) | (⁷) | (⁵) | (⁶) |

¹ Polypropylene.
² Polythylene.
³ NaOH 21 g.; sodium tartrate 10.1 g.
⁴ Occurred.
⁵ Somewhat yellowish tint.
⁶ Courless, transparent.
⁷ Slightly yellowish compared with D.

EXAMPLE 3

(1) Propylene was polymerised for 6 hours in 45 litres of heptane with the use of 30 g. of titanium trichloride and 51 g. of diethylaluminium chloride as catalyst, whereupon approximately 30 kg. of a polypropylene was obtained.

(2) Next, the polypropylene thus prepared was diluted with 55 litres of heptane, and 1.2 litres of butanol was added thereto. The resulting mixture was agitated for one hour at 75 degrees C., after which 33 g. of potassium hydroxide (corresponding to 60-percent degree of neutralisation) dissolved in 0.4 litre of butanol was added to the resulting mixture thus agitated. The mixture thus obtained was further agitated for one hour at 75 degrees C.

(3) Thereafter, to the resulting process material, 48 g. of potassium hydroxide and 90 kg. of water were added, and the resulting mixture was agitated for one hour at 75 degrees C. The pH value of the aqueous phase at this time was 10.5.

When this process material was left standing, it separated into an upper layer of a polypropylene, an oil phase composed of heptane and butanol, and a lower layer consisting of the aqueous phase in which the catalyst residue was suspended. After the lower layer was separated, 16 g. of potassium hydroxide and 90 kg. of water were further added, and the resulting mixture was agitated for one hour at 75 degrees C. The pH value of the aqueous phase at the time of this second rinsing with an alkaline aqueous solution was 10.2. The total quantity of potassium hydroxide used was 97 g.

The aqueous phase was then separated, and heptane and butanol were centrifugally separated, whereupon a polypropylene cake was obtained. This cake was dried under reduced pressure to produce a product polypropylene, which had an ash content corresponding to 34 p.p.m. of aluminium and 17 p.p.m. of titanium.

(4) The polypropylene thus prepared was press formed into a sheet, the colour of which was measured by means of a colour machine, CM-20, manufactured by the Colour Machine Company.

The colour of a polypropylene can be represented by the degree of yellow colouration thereof. As a measure of this colouration, there is a so-called "$b$ value," and the magnitude of yellow colouration varies with this value, being high for a large $b$ value and being low for a small $b$ value whereby the polypropylene can be said to be colourless. The product polypropylene produced in this example had a $b$ value of 4.3 and was colourless.

butanol were added, and the resulting mixture was agitated for 2 hours at 75 degrees C. The resulting process material was not neutralised in a non-aqueous system but was immediately subjected to rinsing with an alkaline aqueous solution.

More specifically, 81 g. of potassium hydroxide and 90 kg. of water were added as set forth in step (3) in Example 3, and the resulting mixture was agitated for one hour at 75 degrees C. and then subjected to a first rinse. The second rinse was also carried out as set forth in steps (3) of Example 3.

The total quantity of potassium hydroxide used was 97 g. which was the same as that in Example 3. The pH value of the aqueous phase was 10.4 at the time of the first water rinsing and 10.6 at the time of the second rinsing.

The ash content within the product polypropylene corresponded to 36 p.p.m. of aluminium and 23 p.p.m. of titanium and, therefore, represented an increase over the ash content in the case described in Example 3.

As a result of colour measurement under the same conditions as in Example 3, a $b$ value of 4.6 was obtained, which represented a higher degree of yellow colouration than that of Example 3.

Reference Example 2

To a polypropylene prepared in accordance with step (1) of Example 3, 55 litres of heptane, 1.6 litres of butanol, and 33 g. of potassium hydroxide were added simultaneously, and the resulting mixture was agitated for 2 hours at 75 degrees C. That is, a neutralisation step as an independent process step was not carried out. Thereafter, the process material was processed as described in step (3) of Example 3.

The ash content within the product polypropylene corresponded to 39 p.p.m. of aluminium and 39 p.p.m. of titanium and, therefore, represented an increase over those in Example 1 Reference Example 1. The colouration $b$ value was 5.8, which represented a higher degree of yellow colouration than those in Example 3 and Reference Example 1.

Reference Example 3

After a butanol treatment as described in step (2) of Example 3, 81 g. of potassium hydroxide (corresponding to a degree of neutralisation of 140 percent) dissolved in 0.8 litre of butanol was added to the process material, which was then agitated for one hour at 75 degrees C.

90 kg. of water was then further added to the process batch, which was then agitated for one hour at 75 degrees C. Thereafter, the procedure set forth in step (3) of Example 3 was followed.

The total quantity of potassium hydroxide used was 97 g. which was the same as that in Example 3. The ash content within the product polypropylene corresponded to 44 p.p.m. of aluminium and 28 p.p.m. of titanium and, therefore, represented an increase over that in Example 3. The colouration $b$ value was 7.2, which represented a substantial yellow colouration.

EXAMPLE 4

Substantially the same procedure as set forth in Example 3 was carried out except for the following differences.

Neutralisation was carried out with a solution of 6 g. of potassium hydroxide (corresponding to a degree of neutralisation of 10 percent) in 0.4 litre of butanol, and rinsing with an alkaline aqueous solution was carried out with a solution of 75 g. of potassium hydroxide in 90 kg. of water. The process batch was then left standing to separate a lower layer of aqueous phase, and then rinsing was carried out twice with a solution of 16 g. of potassium hydroxide in 90 kg. of water.

The total quantity of alkali hydroxide used was 97 g. The product polypropylene had an ash content corresponding to 35 p.p.m. of aluminium and 21 p.p.m. of titanium and had a $b$ value of 4.5.

Reference Example 4

Substantially the same procedure as described in Example 3 was carried out except for the following differences.

Neutralisation was carried out with a solution of 57 g. of potassium hydroxide (corresponding to a neutralisation degree of 100 percent) in 0.4 litre of butanol, and rinsing with an alkaline aqueous solution was carried out with a solution of 24 g. of potassium hydroxide in kg. of water. The process batch was then left standing to separate a lower water-phase layer and was then subjected to two rinsing steps with a solution of 16 g. of potassium hydroxide in 90 kg. of water.

The total quantity of alkali hydroxide used was 97 g. The product polypropylene had an ash content corresponding to 38 p.p.m. of aluminium and 24 p.p.m. of titanium and had a $b$ value of 4.8.

We claim:

1. In a process of purifying a polyolefin which has been prepared by polymerization of a corresponding monomer through the use of a titanium-aluminium containing Ziegler catalyst and which is in suspension in a $C_4$ to $C_{12}$ hydrocarbon to a treatment with a lower alkanol of up to 10 carbon atoms, and then to a treatment with an alkaline aqueous solution to separate out catalyst residue the improvement which comprises: (1) neutralizing a slurry of said catalyst residue in a non-aqueous system whereby from 5 to 80 mol percent of acidic substances in the catalyst are neutralized but not separated out from the slurry (2) rinsing said neutralized slurry with an aqueous alkaline solution of a pH of at least 5.0 to stratify said slurry and separate and suspend the major amount of catalyst residue in an aqueous phase layer and suspend said polyolefin in the oil phase layer and (3) separating the two layers to remove the residual catalyst in the aqueous phase as a suspended solid.

2. A polyolefin purification process as claimed in claim 1 in which the pH value of said alkaline aqueous solution is within the range of from 8 to 13.

3. A polyolefin purification process as claimed in claim 1 in which said neutralization is carried out with the use of the same alkali as that to be used in said alkaline aqueous solution.

4. A polyolefin purification process as claimed in claim 1 in which said alkaline aqueous solution is an alkali selected from the group consisting of ammonia, potassium hydroxide, sodium hydroxide, barium hydroxide, calcium hydroxide, and metal alcoholates.

References Cited

UNITED STATES PATENTS

| 3,036,055 | 5/1962 | Greenwell | 260—93.7 |
| 3,127,385 | 3/1964 | Mostadini et al. | 260—93.7 |
| 3,141,009 | 7/1964 | Shuman | 260—88.3 |
| 3,219,622 | 11/1965 | Luciani et al. | 260—94.9 X |
| 3,445,444 | 5/1969 | Kutner | 260—93.7 |

JOSEPH L. SCHOFER, Primary Examiner

W. F. HAMROCK, Assistant Examiner

U.S. Cl. X.R.

260—88.2 S, 94.9 F, 96